United States Patent

Moody et al.

[11] 3,981,048
[45] Sept. 21, 1976

[54] SMOOTH EXTERIOR DUAL CLAMP

[75] Inventors: Roy A. Moody, Flossmoor; Ronald T. Fulton, Tinley Park, both of Ill.

[73] Assignee: Panduit Corporation, Tinley Park, Ill.

[22] Filed: Dec. 29, 1975

[21] Appl. No.: 644,694

[52] U.S. Cl.............................. 24/16 PB; 24/81 CC; 248/74 PB
[51] Int. Cl.²......................................... B65D 63/00
[58] Field of Search..................... 24/16 PB, 81 CC; 248/68, 74 PB

[56] References Cited
UNITED STATES PATENTS 2,915,268  12/1959  Wrobel .......................... 24/16 PB
3,654,669   4/1972  Fulton ............................ 24/16 PB Primary Examiner—Werner H. Schroeder
Assistant Examiner—Doris L. Troutman
Attorney, Agent, or Firm—Charles R. Wentzel; Richard B. Wakely

[57] ABSTRACT

A clamp for holding a pair of elongate objects such as hoses in spaced, generally parallel relationship. The clamp includes a first elongate flexible strap for engaging one of the objects and a second elongate flexible strap for engaging the other object. The clamp also includes a locking head disposed intermediate the straps for receiving the second strap. The locking head includes locking means for holding the second strap after it has been threaded into the locking head and the first strap carries an apertured frame adjacent its free end. After the first strap has been positioned to partially encompass one of the objects, the second strap can be positioned to partially encircle the other object and the free end of the second strap threaded into the frame, between the objects, and into the locking head thereby holding the objects in spaced, generally parallel relationship.

18 Claims, 8 Drawing Figures

SMOOTH EXTERIOR DUAL CLAMP

BACKGROUND OF THE INVENTION

This invention relates to harnessing apparatus and more particularly to a clamp for holding a pair of elongate devices such as hoses in spaced, generally parallel relationship.

It is quite common during the filling of a gasoline tank for a certain amount of the gasoline to escape in the form of fumes. Such fumes are particularly heavy on a hot day and besides having an unpleasant odor, the fumes are highly flammable and contain pollution causing unburned hydrocarbons. Legislation has been proposed which requires these fumes to be recovered as the tank is filled. One method proposed to comply with such legislation includes providing a suction above the liquid level in the gasoline tank. In this method, a second or suction hose is run parallel to the gasoline hose for returning the vapors to the main gasoline storage tank.

If these parallel hoses were held together only at the pump and at the nozzle they could become twisted and tangled causing an effective reduction in their overall length and they would present an unsightly appearance. Prior art devices for mounting a pair of elongate objects in spaced, generally parallel relationship have strength limitations which make them unsuited for holding hoses in a heavy use application such as a gasoline station where the hoses are often being looped and pulled. Furthermore, such prior art mounts typically are not smooth having projections which could catch on clothing or scratch the finish of an automobile. Reference may be made to U.S. Pat. Nos. 3,430,904 and 3,432,129.

A double-latch cable tie has been proposed for holding two bundles of wires. Such a cable tie, while excellent for use with two relatively small bundles of wires, would be difficult to thread if two relatively large hoses were to be held. In this cable tie the free end of the strap is threaded into the locking head from adjacent the top of one bundle and upon leaving the locking head, it must be sharply deflected to ride over the top portion of the other bundle. Such a tie is shown in commonly-assigned U.S. Pat. No. 3,654,669.

SUMMARY OF THE INVENTION

Among the several objects of the present invention may be noted the provision of an improved clamp for holding a pair of objects such as hoses in spaced, generally parallel relationship; the provision of such a clamp which, when installed, has a generally smooth periphery; the provision of such a clamp which is conveniently installed and which simultaneously tightens about both objects upon operator tensioning of a single strap; the provision of such a clamp which reduces the load of its primary locking means while securely holding the objects; the provision of such a clamp which generally uniformly distributes compressive forces about the periphery of the held object and opposes the objects twisting relative to one another; and the provision of such a clamp which has long service life and is simple and economical to manufacture. Other objects and features will be in part apparent and in part pointed out hereinafter in the specification and in the claims.

Briefly, the clamp of the present invention includes first and second elongate flexible straps and a locking head disposed intermediate the straps. Each strap engages one of the objects and the locking head receives the second strap. The locking head includes locking means for holding the second strap after it has been threaded into the locking head. The first strap carries an apertured frame adjacent its free end so that after the first strap has been positioned to partially encompass one of the objects, the second strap can be positioned to partially encircle the other object and the free end of the second strap threaded into the locking head thereby holding the objects in spaced, generally parallel relationship.

BRIEF DESCRIPTION OF THE DRAWINGS

Corresponding reference characters indicate corresponding components throughout the several views of the drawings.

DESCRIPTION OF THE PREFERRED EMBODIMENT

Figure 1:
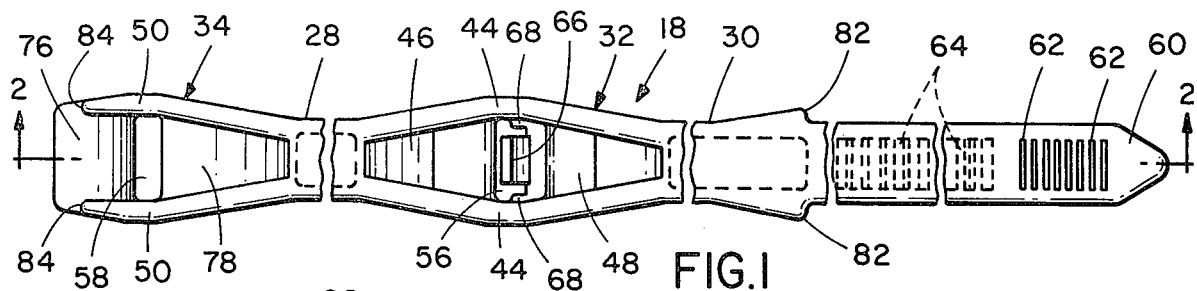
FIG. 1 is a plan of a double hose clamp of the present invention for holding a pair of hoses in side by side spaced relationship.
Figure 2:
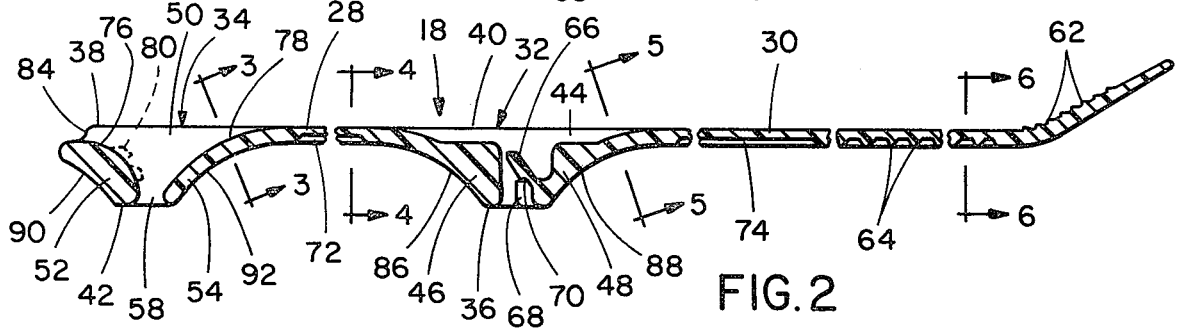
FIG. 2 is a sectional view taken generally along line 2—2 of FIG. 1.
Figure 3:
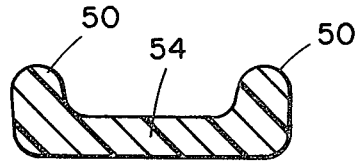
FIGS. 3, 4, 5, and 6 are respective cross-sectional views taken generally along lines 3—3, 4—4, 5—5, and 6—6 of FIG. 2.
Figure 4:
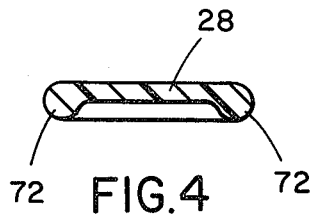
Figure 5:
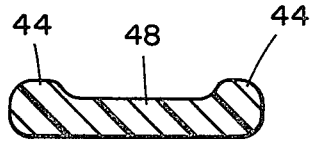
Figure 6:
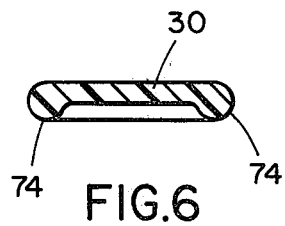
Figure 7:
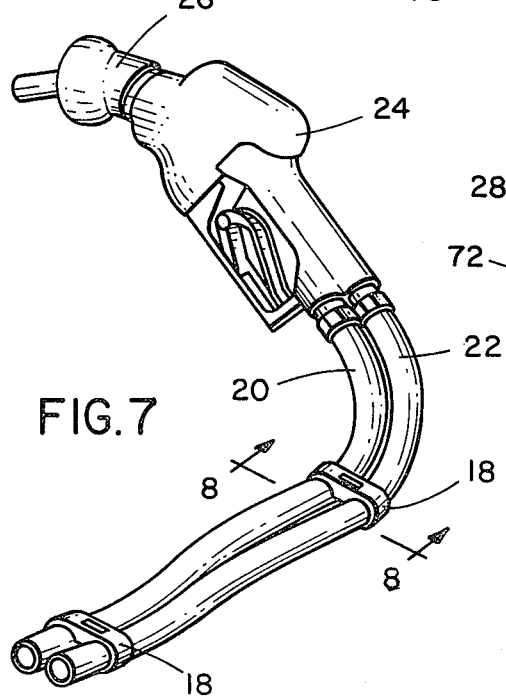
FIG. 7 is a prospective view showing the hose clamp holding a pair of hoses.

Referring now to the drawings, a clamp for holding a pair of elongate objects such as hoses is generally indicated in FIGS. 1 and 2 by reference numeral 18. Clamp 18 is particularly suited, as will appear more fully hereinafter, for use in securely holding a pair of rubber hoses such as a gasoline delivery hose 20 and a vapor recovery hose 22, shown in FIG. 7, attached to a gasoline nozzle equipped with suitable vapor recovery means including, for example, a gasoline tank filler pipe seal 26.

Clamp 18 is preferably of molded thermoplastic one-piece construction and comprises a first elongate flexible strap 28 for engaging, for example, gasoline hose 20 and a second elongate strap 30 for holding vapor recovery hose 22. Straps 28, 30 are joined by a locking head 32 including locking means for securely holding strap 30 while strap 28 carries an apertured frame 34 for receiving strap 30 after strap 28 has been positioned to partially encircle hose 20 and strap 30 has been positioned to partially encompass hose 22.

Figure 8:
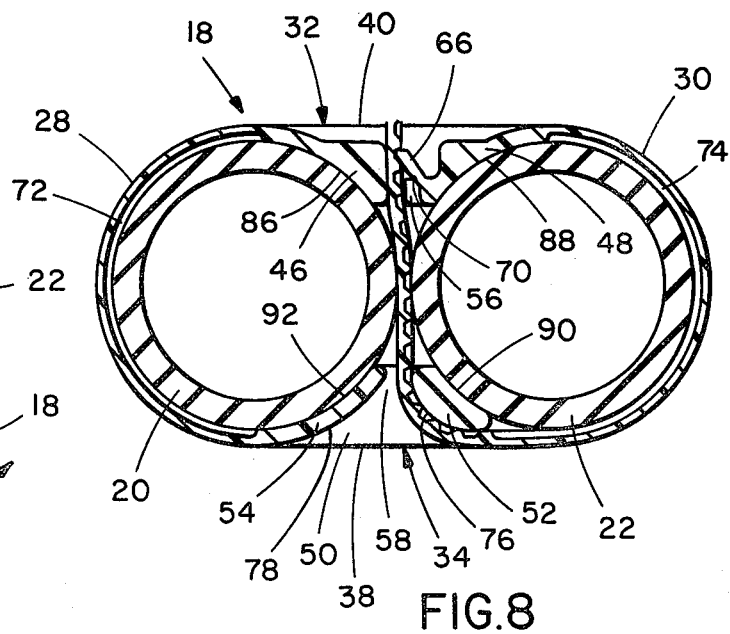
FIG. 8 is an enlarged cross-sectional view of the clamp holding the hoses of FIG. 7.

More particularly, as shown in FIG. 2, locking head 32 and frame 34 have respective strap entry and strap exit faces 36, 38 and 40, 42, respectively. Head 32 comprises spaced side walls 44 and end walls 46, 48 which merge into respective straps 28 and 30. Similarly, frame 34 comprises spaced side walls 50 and end walls 52, 54 with the latter end wall merging into strap 28. The respective walls of the head and frame define respective strap-receiving apertures 56, 58. As shown in FIG. 2, in the as-molded condition of clamp 18, strap entrance face 38 of frame 34 and strap exit face 40 of locking head 32 are generally coplanar with the respective surfaces of straps 28 and 30 adapted to be disposed away from the hoses when the clamp is installed. This feature, as shown in FIG. 8, provides a generally smooth periphery of the installed clamp when the excess threaded portion of strap 30 has been severed and avoids the clamp catching on clothing or scratching the exterior finish of a vehicle. Also with reference to FIG. 2, strap 30 terminates in a tapered tip 60 bent out of the longitudinal direction of strap 30 toward head entry face 40 to insure the tip is in proper alignment for reception by strap-receiving aperture 56 of the locking head. Tip 60 is preferably provided with a plurality of spaced transverse ribs 62 serving as finger grips.

One surface of strap 30 has a plurality of spaced transverse teeth 64. The locking means of locking head 32 comprises a flexible pawl 66 extending into aperture 56 and toward strap exit face 40 for sequentially engaging teeth 64 and for securely holding a predetermined one of the teeth upon attempted retrograde movement of strap 30 through locking head 32. Pawl 66 is movable between a strap threading position wherein it is disposed adjacent strap exit face 40 and out of locking engagement with the teeth and a locking position, as shown in FIG. 8, wherein pawl 66 is disposed closer to the strap entry face 36 than it is in the strap threading position and lockingly engages one of teeth 64 thereby holding strap 30 from substantial retrograde movement through locking head 32. Locking head 32 also comprises a pair of spaced shoulders 68 extending into aperture 56 adjacent pawl 66 but disposed closer strap entry face 36 for limiting movement of strap 30 toward pawl 66 as the strap is threaded. A notch 70 may advantageously be provided in the neck portion of the pawl to increase its flexibility. While one type of locking means has been described, it will readily be understood by those skilled in the harnessing art that other types of locking means could also be used, for example, a metallic barb embedded in the locking head for biting into strap 30.

Strap 28 includes a pair of spaced longitudinal side rails or ribs 72 extending from the surface of strap 28 for engaging hose 20. Strap 30 has a similar set of rails or ribs 74. These rails serve to firmly grip the hoses to oppose their twisting about their longitudinal axis relative to one another and to prevent the clamp from sliding in the longitudinal direction of the hoses.

Frame end walls 52, 54 each include respective surfaces 76, 78 extending from adjacent strap entry face 38 and converging toward strap exit face 42 for guiding strap 30 into aperture 38. Surface 76 may optionally have one or more teeth 80, shown in phantom in FIG. 2, shaped complimentary to strap teeth 64 for engaging strap 30 after clamp 18 has been installed. Strap 30 has a pair of laterally extending shoulders 82 engagable with abutment means on frame 34 in the form of stops 84 disposed between strap entry face 38 and guide surface 76. Shoulders 82 and stops 84 function to limit the extent of insertion of strap 30 through frame 34. As the spacing between surface 76 and strap entry face 38 at stops 84 is approximately equal to the thickness of strap 30; in the installed position of clamp 18, the outside surface of strap 30 at its entry into the frame and strap entry face 38 are generally coplanar to give the clamp an especially smooth periphery. It is noted that end walls 46, 48, 52, and 54 of the locking head and frame have respective concave surfaces 86, 88, 90, and 92 (shown in FIGS. 2 and 8) shaped complimentary to the exterior surfaces of the hoses. These concave surfaces act with the straps to distribute compressive forces generally uniformly about the outside surfaces of the hoses.

Operation and installation of clamp 18 are as follows: After hoses 20, 22 are positioned to engage respective locking head surfaces 86, 88, strap 28 is flexed until it partially encircles hose 20 and frame surface 90 engages hose 22. Thereafter, strap 30 is flexed about hose 22, inserted through frame 34 and between the hoses, and tip 60 is threaded through locking head 32 preferable until at least the first of teeth 64 passes pawl 66. The user then can conveniently tighten clamp 18 by applying force adjacent locking head exit face 40 while putting strap 30 through the locking head until strap shoulders 82 engage frame stops 84 and the clamp securely holds the hoses. It will be appreciated that in the tightened condition of the clamp, side rails 72, 74 indent the hoses so as to frictionally hold the hoses from turning about their longitudinal axis relative to one another. It should also be noted that the present invention provides the advantageous feature that the tightening of a single strap causes tightening of the clamp about both hoses simultaneously. This occurs because of the frictional engagement between strap 30 and guide surface 76 of the frame which causes the frame to be pulled toward locking head 32 as strap 30 is tightened. Of course, the coefficient of friction between strap 30 and surface 76 increases as the clamp is tightened because the strap is pushed into engagement with the surface with increasing force. This frictional engagement also acts to absorb part of the load placed on the pawl after release of the tightened strap when, due to their resiliency, the slightly compressed hoses exert forces tending to cause retrograde movement of the strap 30 through the locking head. As shown in FIG. 8, after tightening the hoses tend to pinch strap 30 therebetween causing a further reduction of the load on pawl 66.

It will be apparent that besides its hose holding application, the clamp of the present invention is also suited for holding a pair of wire bundles, cables, . . . etc.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. A clamp for holding a pair of elongate objects such as hoses in spaced, generally parallel relationship, said clamp comprising:
   a first elongate flexible strap for engaging one of said objects;
   a second flexible strap for engaging the other of said objects; and
   a locking head disposed intermediate said straps for receiving said second strap and including locking means for holding said second strap after it has been threaded into said locking head, said first strap carrying an aperture frame adjacent its free end whereby after said first strap has been positioned to partially encompass one of the objects, said second strap can be positioned to partially encircle the other object and the free end of the second strap threaded into said frame, between the longitudinal axes of said objects, and into said locking head thereby to hold said objects in spaced, generally parallel relationship.

2. A clamp as set forth in claim 1 wherein said first and second straps and said locking head are integral.

3. A clamp as set forth in claim 1 wherein said clamp is of molded thermoplastic construction and wherein said locking head and said frame each have strap entry and strap exit faces, in the as-molded portion of said clamp the strap entry face of said frame and the strap exit face of said head being substantially coplanar with respective surfaces of said first and second straps adapted to be disposed away from said objects when said clamp is installed holding said objects whereby said clamp, when installed and after severance of any excess threaded portion of said second strap extending from the strap exit face of said locking head, presents a generally smooth periphery.

4. A clamp as set forth in claim 1 wherein one of said straps includes a surface for disposition toward one of said objects and includes at least one rib extending from said surface for engaging the object.

5. A clamp as set forth in claim 4 wherein said rib extends in the longitudinal direction of the strap of which it is comprised.

6. A clamp as set forth in claim 2 wherein said locking head includes a pair of spaced side walls and a pair of spaced end walls, the aforementioned walls defining a strap-receiving opening.

7. A clamp as set forth in claim 6 wherein at least one of said end walls merges into a respective one of said straps and wherein at least one of said end walls comprises a concave surface for engaging one of said objects.

8. A clamp as set forth in claim 1 wherein said locking head comprises strap entry and exit faces and a strap-receiving aperture extending between said faces, said locking means comprising a flexible pawl extending into said aperture and toward said strap exit face.

9. A clamp as set forth in claim 8 wherein said second strap includes a plurality of spaced transverse teeth sequentially with said pawl, said pawl being movable between a strap threading position wherein said pawl is disposed adjacent said strap exit face and out of locking engagement with said teeth and a locking position wherein said pawl is disposed closer said strap entry face than it is in said strap threading position and securely engages at least one of said teeth whereby said second strap is held from substantial retrograde movement through said locking head.

10. A clamp as set forth in claim 8 wherein said locking head comprises at least one shoulder extending into said aperture adjacent said pawl for limiting movement of said second strap towards said pawl.

11. A clamp as set forth in claim 10 wherein said shoulder is positioned closer said strap entry face than said pawl.

12. A clamp as set forth in claim 1 wherein said frame includes a pair of spaced side walls and a pair of spaced end walls defining a strap-receiving aperture.

13. A clamp as set forth in claim 12 wherein said frame has a strap entry face and a strap exit face and said end walls include respective surfaces converging toward said strap exit face for guiding said second strap into said aperture.

14. A clamp as set forth in claim 12 wherein at least one of said end walls comprises a concave surface for engaging one of said objects.

15. A clamp as set forth in claim 1 wherein said second strap comprises a transverse shoulder and said frame includes abutment means engagable with said shoulder for limiting the extent of insertion of said second strap through said frame.

16. A clamp as set forth in claim 12 wherein said second strap includes teeth and wherein the end wall of said frame remote from said first strap comprises at least one tooth shaped complimentary to said teeth extending into said aperture for engaging one of said teeth.

17. The combination of a clamp and a pair of elongate objects such as hoses, said clamp comprising:
   a first elongate flexible strap disposed about the first object;
   a second elongate flexible strap disposed at least partially about the second object; and
   a locking head joining said straps and disposed between said objects, said second strap including a strap-receiving frame disposed between said hoses receiving said first strap and engaging said first object, said head including an aperture for receiving said first strap and locking means for securely engaging said first strap to prevent retrograde movement thereof through said locking head.

18. A clamp for holding a pair of elongate objects such as hoses in spaced, generally parallel relationship, said clamp comprising:
   a first elongate flexible strap for engaging one of said objects;
   a second elongate flexible strap for engaging the other of said objects; and
   a locking head disposed intermediate said straps for receiving said second strap and including locking means for holding said second strap after it has been threaded into said locking head, said first strap carrying an aperture frame adjacent its free end whereby after said first strap has been positioned to partially encompass one of the objects, said second strap can be positioned to partially encircle the other object and the free end of the second strap threaded into said frame, between the longitudinal axes of said objects, and into said locking head thereby to hold said objects in spaced, generally parallel relationship.

* * * * *

UNITED STATES PATENT AND TRADEMARK OFFICE
CERTIFICATE OF CORRECTION

PATENT NO. : 3,981,048
DATED : September 21, 1976
INVENTOR(S) : Roy A. Moody and Ronald T. Fulton It is certified that error appears in the above—identified patent and that said Letters Patent are hereby corrected as shown below:

Title [54]: SMOOTH EXTERIOR DUAL CLAMP should be -- SMOOTH EXTERIOR DUAL HOSE CLAMP --;

Column 4, line 52: insert --elongate-- after "second";

Column 5, line 37: insert --engageable-- after "sequentially".

Signed and Sealed this

Eleventh Day of January 1977

[SEAL]

Attest:

RUTH C. MASON
*Attesting Officer*

C. MARSHALL DANN
*Commissioner of Patents and Trademarks*